(12) United States Patent
Kamen et al.

(10) Patent No.: US 6,525,728 B2
(45) Date of Patent: *Feb. 25, 2003

(54) METHOD AND APPARATUS FOR USING A GENERAL THREE-DIMENSIONAL (3D) GRAPHICS PIPELINE FOR COST EFFECTIVE DIGITAL IMAGE AND VIDEO EDITING, TRANSFORMATION, AND REPRESENTATION

(75) Inventors: Yakov Kamen, Cupertino, CA (US); Leon Shirman, Redwood City, CA (US)

(73) Assignee: ISURFTV, Sunnyvale, CA (US)

(*) Notice: Subject to any disclaimer, the term of this patent is extended or adjusted under 35 U.S.C. 154(b) by 46 days.

This patent is subject to a terminal disclaimer.

(21) Appl. No.: 10/004,737

(22) Filed: Dec. 4, 2001

(65) Prior Publication Data

US 2002/0041286 A1 Apr. 11, 2002

Related U.S. Application Data

(63) Continuation of application No. 09/344,442, filed on Jun. 25, 1999, now Pat. No. 6,342,884.
(60) Provisional application No. 60/118,505, filed on Feb. 3, 1999.

(51) Int. Cl.$^7$ ............................................. G06T 17/20
(52) U.S. Cl. ........................ 345/423; 345/582; 345/585
(58) Field of Search ................................. 345/419, 420, 345/423, 582, 629, 606, 585, 588

(56) References Cited

U.S. PATENT DOCUMENTS

| 5,369,735 | A | 11/1994 | Their et al. ................. 395/123 |
| 5,550,960 | A | 8/1996 | Shirman et al. ............. 395/130 |
| 5,825,369 | A | 10/1998 | Rossignac et al. .......... 345/440 |
| 5,956,038 | A | 9/1999 | Rekimoto .................... 345/419 |
| 5,991,437 | A | 11/1999 | Migdal et al. ............... 382/154 |
| 6,011,581 | A | 1/2000 | Swift et al. .................... 348/58 |
| 6,047,088 | A | 4/2000 | Van Beck et al. .......... 382/243 |

OTHER PUBLICATIONS

Sederberg et al., "Implicitization Using Moving Curves and Surfaces", ACM Conference on Computer Graphics and Interactive Techniques, Aug. 1995.
3D Studio Max Tutorials, pp. 3–17 to 3–19, Mar. 1996.

*Primary Examiner*—Mano Padmanabhan

(57) ABSTRACT

A method in accordance with our invention permits the manipulation of a two-dimensional pixel array using a standard 3D graphics pipeline. The method comprises the steps of forming a wire mesh of the two-dimensional image. This wire mesh comprises a set of triangles, in which all of the vertices and sides of the triangles are located in the same plane in x, y, z coordinate space. The 2D image is then mapped into the mesh. The resulting object representation can then be manipulated in the same manner that 3D representations are manipulated by a 3D graphics pipeline.

15 Claims, 4 Drawing Sheets

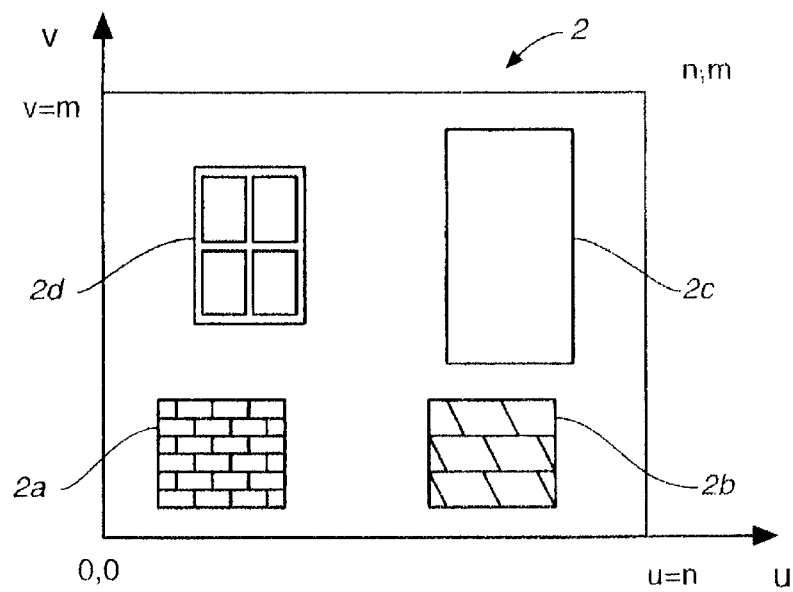
FIG._1A
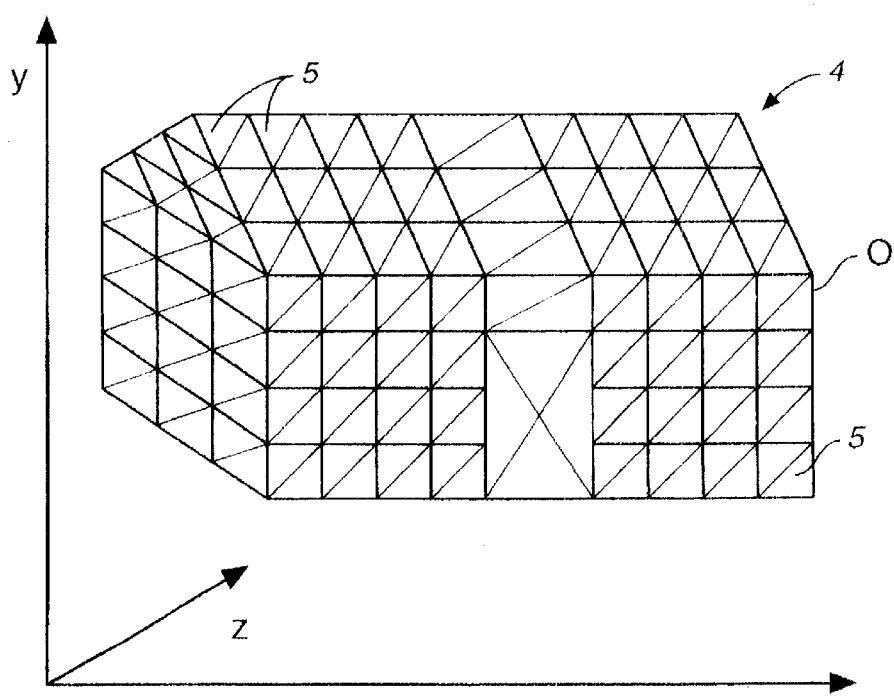
FIG._1B

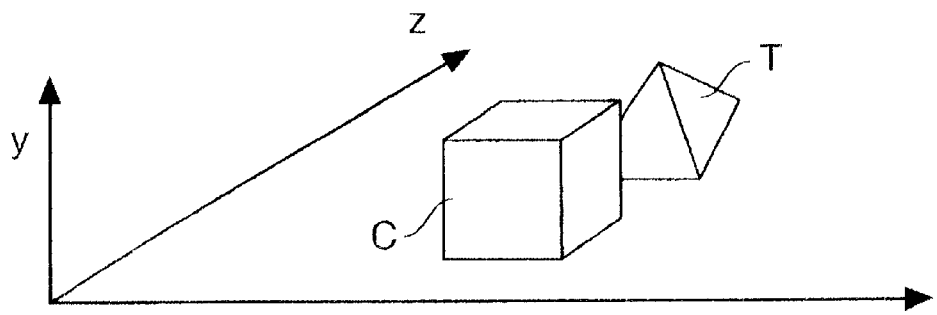
FIG._1C
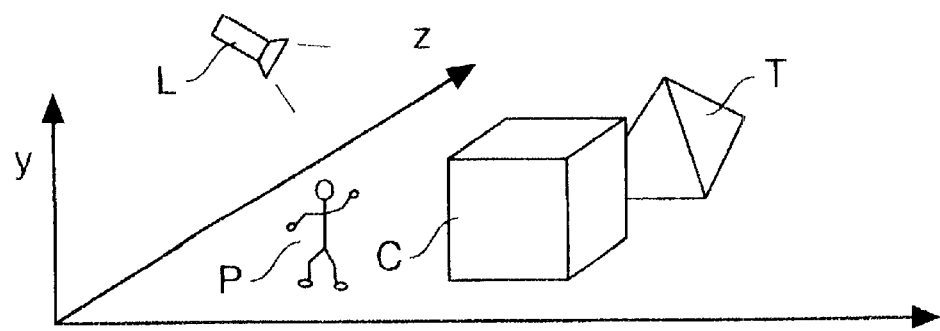
FIG._1D
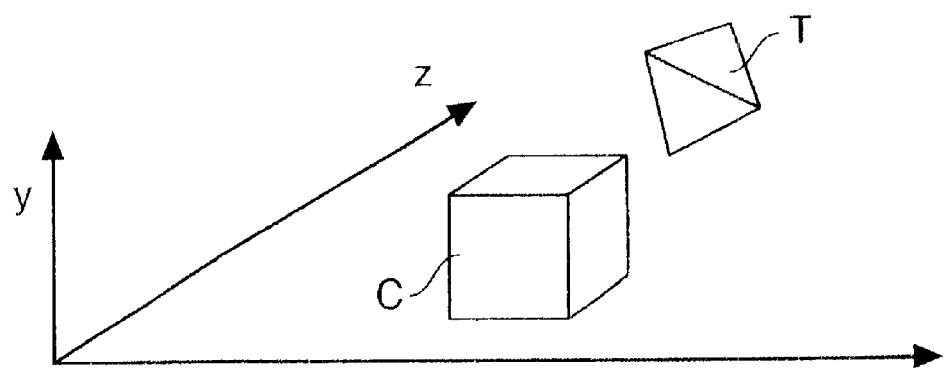
FIG._1E

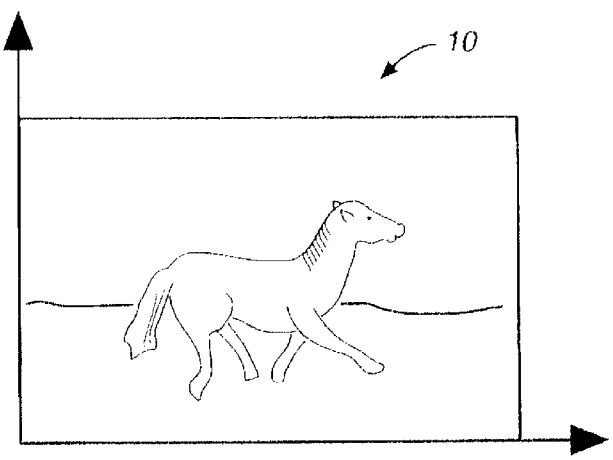
FIG._2A
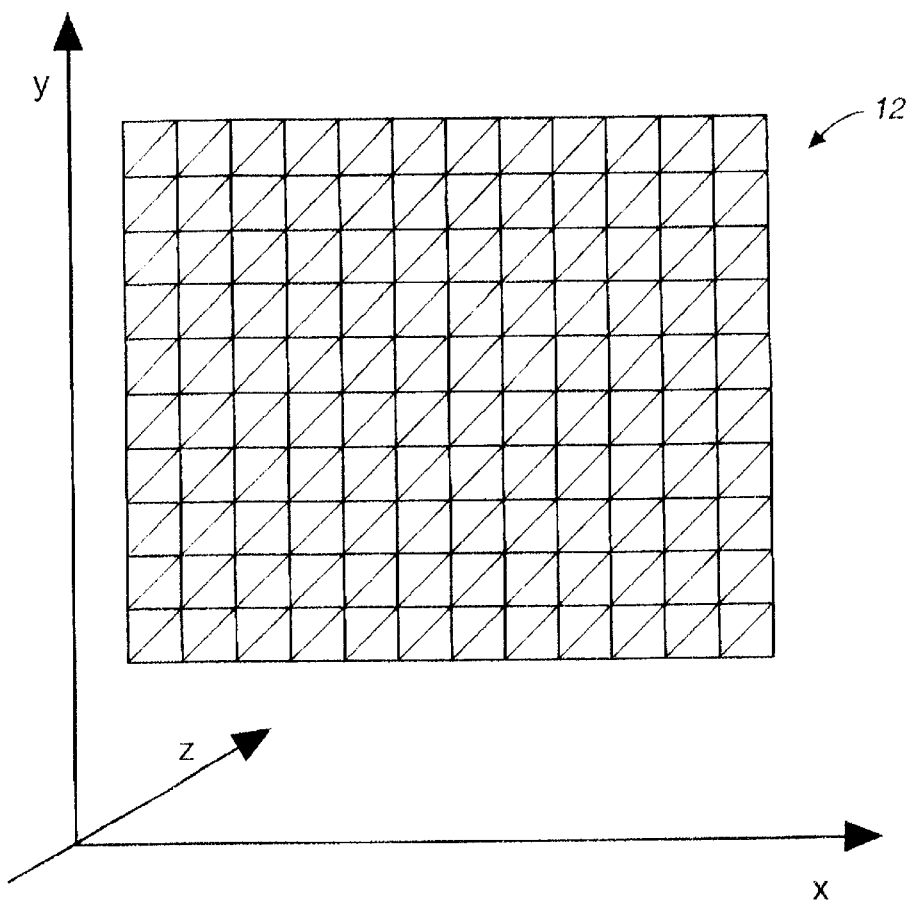
FIG._2B

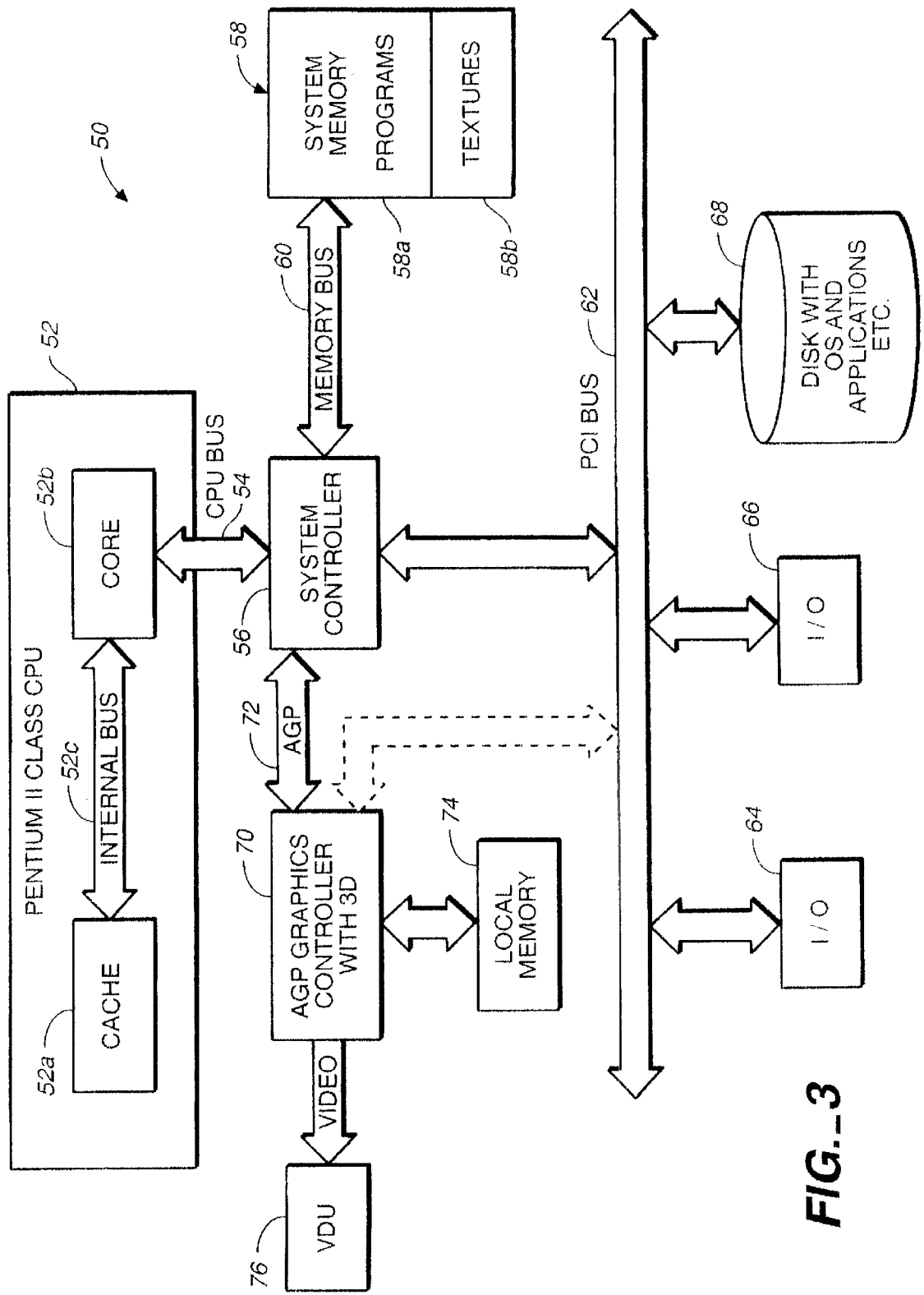
FIG._3

METHOD AND APPARATUS FOR USING A GENERAL THREE-DIMENSIONAL (3D) GRAPHICS PIPELINE FOR COST EFFECTIVE DIGITAL IMAGE AND VIDEO EDITING, TRANSFORMATION, AND REPRESENTATION

This patent is a continuation of U.S. patent application Ser. No. 09/344,442, filed Jun. 25, 1999, now U.S. Pat. No. 6,342,884, which claims priority based on U.S. Provisional Patent Application Serial No. 60/118,505, filed Feb. 3, 1999, incorporated herein by reference.

BACKGROUND OF THE INVENTION

This invention pertains to digital image and video manipulation.

During the process of video and image editing, one alters portions or all of a video image, e.g. by moving an image from one portion of a screen to another, rotating the image, expanding the image or shrinking the image. Other common image manipulations include warping an image (i.e. deforming the image in three dimensions), magnifying parts of an image, performing cylindrical, spherical, hyperbolic, or parabolic transformations to the image (e.g. causing a two-dimensional image to appear to bend or wrap around a cylindrical, spherical, hyperbolic or parabolic surface), melting images, etc.

Frequently, the image to be manipulated is in the form of a pixel array. In other words, the image is stored as an array of data values, each value corresponding to the color and brightness of a small area of the image. When performing the above-mentioned video image manipulations, one typically performs calculations to transform every pixel of the image. For example, for each pixel of the image, one performs calculations to determine a new location for that pixel on a video screen. Large image can contain millions of pixels. Further, for the case of image streams (e.g. as in the case of video images), dozens of frames per second must be transformed. Thus, many millions of pixels may have to be analyzed and modified for each transformation in a very short amount of time. Such transformations require either enormous CPU resources or special hardware to be able to transform large numbers of pixels in a short amount of time.

It would be desirable to provide a method for editing and/or manipulating two-dimensional images. This is particularly desirable so that one can edit and/or manipulate many frames of two-dimensional images per second, e.g. a stream of images such as video images. It would be desirable to be able to perform these manipulations quickly and efficiently, without having to construct expensive, sophisticated hardware dedicated to this purpose.

SUMMARY

A method in accordance with our invention comprises the step of transforming 2D images into 3D space and using a 3D graphics pipeline for manipulating the image. This method frees up CPU resources, decreases the amount of time needed to perform image manipulation, and permits new special effects.

In one embodiment of our invention, one obtains an image in the form of an array of pixels. This can be accomplished, for example, by digitizing an image. One then "transforms" these images into 3D space using a 3D graphics pipeline. The graphics pipeline can be completely or partially implemented in software or in hardware (e.g. a 3D hardware accelerator).

There are several ways of transforming the array of pixels into 3D space. Typically, the 3D pipeline defines a set of image surface regions, each image surface region being assigned a location in a three-dimensional coordinate system. However, in the case of one embodiment of out invention, all of the surface regions are coplanar. In one embodiment, the surface regions are all polygons, such as triangles, each triangle being defined by a set of points that are assigned a location in terms of x, y, and z coordinates. (All of the coordinates are set up such that they are all located in the same plane.) However, the surface regions can be defined using other graphics techniques as well. For example, the surface regions or the whole surface can be define using an "implicit" technique, in which the positions of the pixels in the space (surface regions) are defined by mathematical equations.

After the set of surface regions is created, we map the 2D pixel array image onto the set of surface regions, to thereby assign to each surface region a texture. In other words, we "bind" a portion of a picture of the 2D image to each of the surface regions. After performing this step, we use the 3D graphics pipeline to manipulate the image we have created to perform desired image and/or video editing.

We have discovered that this technique is extremely efficient for processing many 2D images quickly. For example, this technique can be used to process a video image stream, which typically comprises 59.94 frames per second, each frame corresponding to a large pixel array. This technique can be used to manipulate 2D images from other sources as well, e.g. digital scanners, cameras, images files downloaded from the internet, or other sources.

In one embodiment, currently existing off-the-shelf 3D pipelines and/or 3D enhanced processors are used to perform this process. Thus, we have discovered a new, inexpensive method for manipulating 2D images without having to construct special processing software and/or hardware from scratch.

It will be appreciated that we use a 3D graphics pipeline in a novel way. Previously, graphics pipelines were used to map a texture onto a geometric object as a method of giving the geometric object a particular appearance, and to create a new virtual environment comprising a set of such objects. This was done by providing a texture image and a geometry to a graphic pipeline to create a new virtual image. This is in contrast to using the geometry to transform and edit the images.

During a method in accordance with out invention, we apply an image and a special type of geometry to a 3D graphic pipeline to generate a 3D image. We then use the 3D graphics pipeline to transform or manipulate that image in a novel manner.

BRIEF DESCRIPTION OF THE DRAWINGS

FIGS. 1A to 1E illustrate the operation of a 3D graphics pipeline.

FIGS. 2A and 2B illustrate manipulation of a 2D image using a method in accordance with our invention.

FIG. 3 is a simplified block diagram of a personal computer (PC) coupled to a graphics controller with a 3D graphics pipeline in accordance with out invention.

DETAILED DESCRIPTION

As mentioned above, a method in accordance with our invention involves using a 3D graphics pipeline in a novel manner to facilitate manipulation of digital images, including video image streams. We will first explain how a 3D graphics pipeline is normally used. Thereafter, we will describe its use during a method in accordance with our invention.

3D Graphics Pipelines

The 3D graphics pipeline referred to in this patent can be implemented by a combination of hardware elements, known as accelerators, and software, some of which is sometimes referred to as drivers. The partitioning between hardware and software may vary, depending upon the CPU used and the graphics card in the system, but the overall system performs the method steps described below. Portions of the pipeline tasks can be performed by software, which is less expensive than hardware, but in general slower than hardware solutions at the present time. The hardware and software that perform the steps described below are referred to simply as a pipeline, without regard to the specific partitioning.

The following is a simplified, general description of 3D graphics pipelines. It is not intended to describe any specific product (e.g. products mentioned later in this patent). Rather, the following description is merely a general explanation of 3D graphics pipelines to assist the reader's understanding.

Currently, graphics objects created using a 3D graphics pipeline can be described as a set of geometric surfaces. One way of constructing a geometric surface in a graphics pipeline is to create a "mesh" of "primitives." A "primitive" is a small geometric surface, that can be defined by a set of vertices. For example, the primitive can be a polygon (e.g. a triangle or quadrilateral) defined within the pipeline in terms of the locations (in x, y, and z coordinate space) of its corners or vertices. A set of several primitives is used to define a larger 3D surface.

Instead of using primitives, such as polygons, some graphics pipelines can process geometric surface areas defined in other ways, e.g. by mathematical equations. This technique for defining geometric surface areas is called "implicit." As explained below, both techniques for defining such surface areas can be used to perform a method in accordance with our invention.

For purposes of clarity of explanation, we will first describe a graphics pipeline that processes geometric surface areas using triangular primitives. Other types of graphics pipelines will be discussed later on.

In this first example, a 3D graphics pipeline constructs a 3D image of an object from a 2D pixel array (typically called a "texture map"). FIG. 1A illustrates a 2D image 2 of a set of "textures" (As will be explained below, this texture map is used to create the image of an object in this case, a house. Image 2 includes a portion 2a, which has the appearance of bricks, portion 2b, which has the appearance of roof shingles, portion 2c, which has the appearance of a door, and portion 2d which has the appearance of a window.) 2D image 2 is stored in a digital memory in the form of an array of pixels. Each location in the memory stores a pixel, which is one or more words of data indicating the color, color saturation and brightness corresponding to that pixel. The location of the pixels within the array is typically referred to as u, v coordinates (not to be confused with the Y, U and V signal names used to described certain video signals). (The u, v coordinates are similar to x, y coordinates of the Cartesian coordinate system. In FIG. 1A, the pixel array is an n by m array, where n and m are integers.)

As mentioned above, FIG. 1A represents a pixel array. Physically, the array comprises data loaded into a memory.

The next step in the process is to provide or prepare a geometric surface. In this example, the geometric surface is in the form of a mesh 4 of primitives 5 of three dimensional space (FIG. 1B) In the case of FIG. 1B, the primitives are triangles, but other types of polygons can be used. The mesh of primitives represents a three-dimensional shape of an object () in 3D space (in the case of FIG. 1B, the shape of a house). The position of each vertex of each triangle within mesh 4 is stored in a memory in the form of x, y and z Cartesian coordinates, relative to the object. These coordinates are sometimes referred to as model coordinates ("MC"). The process of preparing such a mesh is well-known, and described in standard graphics libraries, such as Real 3D, published by Real 3D, a Lockheed Martin Corporation, in 1996, and Direct 3D, published by New Riders Publishing in 1997.

The mesh of FIG. 1B is not displayed as such. Rather, the mesh of FIG. 1B is a representation of what is stored in a digital memory. Specifically, the memory stores the locations, in terms of x, y and z coordinates, of each vertex mesh 4.

The step is to map or "bind" the two-dimensional texture map of FIG. 1A onto mesh 4 of FIG. 1B. This is accomplished by mapping each triangle vertex to a location in the texture map. In effect, a list of data points is prepared that associates each vertex of mesh 4 to the u, v coordinates of a particular point (pixel) in the texture map of FIG. 1A. (The locations in the texture map to which the vertices are bound are sometimes referred to as "control points.")

This portion of the process is roughly analogous to an upholsterer choosing a piece of fabric, a binding it with a few nails to the corner of a couch being upholstered (the nails are like control points). The upholsterer subsequently asks his apprentice to finish attaching the fabric to the couch. In this case, the 3D graphics pipeline finishes the task instead of an apprentice FIGS. 1A and 1B describe the process by which one texture map (FIG. 1A) is mapped onto one mesh 4 representing one object O. A graphics pipeline can, and often does, map one or several texture maps onto the same or several different objects.

The next step in the process is to set up a "world coordinate model" of the various objects to be displayed. This requires establishing a position and directional orientation for each object to be displayed. For example, supposing that there are to be two objects to be viewed, a tetrahedron T and a cube C (FIG. 1C). During this step of the process the pipeline is instructed that Cube C is to be facing in a certain direction, and is to be located partially in front of tetrahedron T relative to a certain frame of reference. Again, the structure of FIG. 1C is not displayed per se. Rather, the graphics pipeline sets up processing of the model coordinates in accordance with the parameters of the position and orientation of the object.

The next step is to select a frame of reference. For example, it might be decided that the "viewer" will want to observe the objects from a position corresponding to a corner of the world coordinate model (e.g. position P in FIG. 1D). Thus a virtual viewpoint, viewing direction and aperture will be selected The parameters associated with this "viewer" define the screen coordinate (SC) system. Further, it might be decided the viewer will observe these objects with a light source located at a position L. The graphics pipeline will set up another processing pipe to process the world coordinate data into the screen coordinate data which will cause a computer screen the display the image as it would be perceived by the observer a position P (e.g. the image of FIG. 1D). In other words, the computer screen will provide an image of tetrahedron T and cube C as they would be observed by a viewer if he were standing at position P, and a light source were present at location L. This image will be provided initially as a pixel array in a frame buffer and then displayed by the computer screen. The image in the frame buffer is refreshed, i.e. regenerated according to the specifications programmed into the pipeline, typically at about 50 to 120 times per second. There are many different methods for optimizing the pipeline, and minimizing the time spent processing the invisible parts of the objects, such as the backside of cube C facing away from the viewer. Such details are well-known to those skilled in the art, and will not be discussed in the detail here.

During the above-described process constructing the pixel array and providing it in the frame buffer, the pipeline a) fetches the portion of texture map 2 "tacked" to the vertices of mesh 4 (and therefore stretched over each triangle), b) determines how and where that portion of the texture map should appear, given the orientation of the triangles relative to the viewer and the location of the light source, and c) constructs the appropriate bit map pixel array for storage in the frame buffer. The contents of this frame buffer are then displayed as an image on a computer screen.

Thereafter, the 3D graphics accelerator permits one to manipulate the displayed objects in any desired manner. For example, if one wants to rotate the image of tetrahedron T by 45° (FIG. 1E), the 3D graphics accelerator facilitates this manipulation. This is accomplished by providing a new set of parameters in the world coordinate model for the graphics pipeline indicating the new position and orientation for tetrahedron T. After this occurs, the next time the graphics pipeline regenerates the image stored in the frame buffer, the regenerated image will reflect this rotation of tetrahedron T.

Similarly, suppose that it is desired to display what would appear to the viewer if he took ten steps forward from his location at position P. The next time the graphics pipeline regenerates the image, it will generate and store another pixel array in the frame buffer corresponding to what would appear to such a viewer, and this pixel array is provided as another image on the computer screen.

It is thus seen that the graphics pipeline is extremely useful in applications such as video games, where it is desired to simulate what would appear to a game player if he were wandering past a set of objects.

As mentioned above, some graphics pipelines create models of geometric surfaces using an implicit technique. These surfaces are often described as a function of the position coordinates, i.e. f (x,y,z), or can also contain some vertices. Control points and additional formulas associated with such surfaces are used to bind a digital pixel array (e.g. an array as shown in FIG. 1A) to the implicitly defines surface, and the process proceeds as described above. The major difference is that instead of defining surface areas in terms of primitives with vertices, the surface areas are defined in terms of mathematical equations.

Manipulation of 2D Images

A process in accordance with our invention begins with the step of obtaining a two-dimensional digital image (e.g. image 10 in FIG. 2A). This step can be performed, e.g., by scanning an image such as a photograph or other picture using a conventional digital scanner. The digital image can also be obtained from a conventional digital camera. The image can also consist of digital video image, e.g. out of a live or stored video stream, which is basically a first succession of 2D images. However, any other source of a 2D digital image can be used. As mentioned above, the digital image is typically stored in a memory as an array of digital values. In one embodiment, the digital values are in a compressed form, e.g. using a compression technique such as MPEG1 or MPEG2 or other formats. In the case of compressed digital values, they must first be decompressed prior to processing. Also, scanned images or digitized images from any source such as cable TV, an antennas, cameras, etc. can be used.

As mentioned above, for the case of video images, dozens of frames per second comprising millions of pixels per second must be processed. We discovered that standard graphics pipelines can be used to process frames of data sufficiently fast to process video images.

Any type of memory can be used to store the digital 2D image, e.g. semiconductor memories (SRAMs, DRAMs or other semiconductor memories), a magnetic memory (e.g. a hard disk, a floppy disk, magnetic tape, or magneto-optic disk), or other type of memory device (e.g. an optical disk). The pixels corresponding to the stored image can be stored in terms of RGB values (e.g. the strength of the red, green and blue components of the pixel color) YUV values or other values. (For YUV values, Y corresponds to the amplitude or brightness of the pixel value, U corresponds to the color and V corresponds to the saturation). The pixel values can be encoded in other ways as well. Depending on the situation, a conversion may be required before further processing.

Next, a 3D graphics pipeline is set up. This is accomplished by providing instructions to the 3D graphics pipeline as to what is to be done with the data that is to be provided. Setting up graphics pipelines per se is well known in the art, e.g. as described in the Microsoft Direct 3D SDK (software developer kit) or Direct 3D.

Thereafter, a computer model of a planar geometric surface is generated. This computer model can comprise a set of primitives, e.g. polygons such as triangles. In another embodiment, the computer model can comprise an implicit description of a flat geometric surface. This implicit description is typically a mathematical function (e.g. a function of x, y and z) as described above.

For the case in which the planar geometric surface comprises a mesh of primitives, the number and shape of primitives and the type of primitives can vary. FIG. 2B illustrates a mesh 12 that can be used to practice a method in accordance with our invention. Mesh 12 is similar to mesh 4 described above. However, unlike mesh 4, all of the vertices of mesh 12 are coplanar (or substantially coplanar). In one embodiment, mesh 12 comprises about 5000 triangles, which would be acceptable for processing a video image. Of course, other numbers of primitives could be used.

After constructing the planar geometric surface (e.g. mesh 12), image 10 is mapped, or bound, onto the flat geometric surface. This is accomplished in the following way. For the case in which the flat geometric surface is a mesh such as mesh 12, each vertex of the flat geometric surface (e.g. the triangle vertices) is associated with an image pixel location (i.e. control point). Thus, each control point is associated with a texture coordinates (u, v) corresponding to a pixel. A table of data listing each vertex and its associated u, v texture space coordinates is set up This is called "binding." (See Kamen, IEEE Computer Society, IEEE Computer Graphics and Applications, January–February 1997, Vol. 17, No. 1). For the case in which an implicit technique is used to define the flat geometric surface, control points within the implicitly defined surface are bound to pixel array coordinate space (u, v coordinate) in a manner analogous to the triangles discussed above.

After image 10 is mapped into mesh 12, the object can be manipulated by manipulating the world coordinates. The world coordinates describe where in the x, y, z space the textured plane is to appear, and what its orientation will be (i.e. what angle it should be held at with respect to the viewer). In addition, the screen coordinates for the object can be changed. As a result, when the 2D textured image is finally prepared, it can be prepared in such a manner that reflects the desired manipulation. For example, it can be rotated about any axis, magnified, shrunk, etc.

After establishment of the world coordinate model and screen coordinate model, the pipeline prepares an array of pixels in the output frame buffer (OFB), including pixels showing the manipulated textured mesh 12. The array of pixels in the OFB is displayed on a CRT or order type of screen.

One can manipulate the video image by, for example, changing the world coordinate parameters, e.g. telling the pipeline to tilt the video image about any axis (including an axis perpendicular to the screen or in the plane of the screen). Thus, when the pipeline regenerates the pixel array in the OFB, the regenerated video image will appear tilted about the selected axis. Since the pipeline will regenerate the image at a preprogrammed rate according to the system used, live video will appear as live video. That is because every time a new pixel array is generated, the texture map, which contains the incoming video frame buffer, is reread and put through the pipeline. Since the texture mapping process also contains features for pixel interpolation, an automatic resolution adaption occurs.

One can bend or warp the image by moving the vertices about which the image is mapped. Thus, one can alter the flat geometric plane of FIG. 2B to thereby warp the image. When the pipeline regenerates the pixel array in the frame buffer, the image will appear warped.

One can move the vertices so that mesh 10 becomes a cylinder. When the pipeline regenerates the pixel array in the frame buffer, the image will appear wrapped around a cylinder. (Of course, the mesh 10 can be altered into other shapes, and the image would be wrapped around the other shape.) These modifications could be done at a speed that would create the impression in the viewer that the image was being wrapped or warped gradually.

One could magnify or shrink images by moving vertices away from or closer to each other, or moving the image closer or further from the viewer in the world coordinate system, or by re-parameterizing the model coordinate to world coordinate conversion.

One could cause the image to "mesh" by causing the vertices to drop at different rates.

The number of 3D manipulations possible is only limited by the energy of a user to try them all out.

Hardware and Software for Practicing An Embodiment of a Method In Accordance With Our Invention One embodiment of our invention can be practiced using a PC having the following:

1. A CPU such as a Celeron or Pentium, e.g. as manufactured by Intel, or a K6 processor, e.g. as manufactured by Advanced Micro Devices.
2. 32 MB of memory or greater.
3. A 3D HW adapter. This a type of graphics card currently available on the market. The 3D HW adapter should have 4 MB of memory (preferably 8 MB) and an advanced graphics port (AGP) interface. (An AGP interface is a type of bus standard that is well-known in the art.) Alternatively, a peripheral connection interface ("PC1") can be used in lieu of a AGP. The PC1 is a type of bus standard that is well known in the art. Examples of appropriate 3D HW adapters include the TNT-2 available from Riva, the AT1 Rage 128, the Matrox G400, the Trident Blade 3D and the S3 Savage.
4. The operating system can be Windows 95, Windows 98, Win2000, or any other operating system that supports direct 3D. The Windows operating system includes a standardized platform called Direct X for Windows.

In one embodiment, a user sets up the flat geometric surface (for example, a triangle mesh) in the Direct 3D windows environment. The set of instructions is then provided to the graphics pipeline, which finishes the rendering process. However, in another embodiment, the PC comprises a bypass mechanism that permits one to access the hardware accelerator directly using a software interface provided by the graphics card manufacturer.

FIG. 3 is a block diagram of a computer system 50 for performing a method in accordance with our invention. Referring to FIG. 3, system 50 comprises a CPU 52, e.g. a Pentium II class CPU, comprising a cache memory 52*a*, a core 52*b* and an internal bus 52*c* for facilitating communication between core 52*b* and cache 52*a*. Core 52*b* communicates via a CPU bus 54 to a system controller 56. System controller 56 communicates with the system memory 58 via a memory bus 60. System memory 58 includes a first portion 58*a* which stores system memory programs and a second portion 58*b* that stores the texture maps such as described above.

Also included in system 50 in a PCl bus 62 for facilitating communication between system controller 56 and I/O devices 64, 66 and disk drive 68. I/O device 64 can be any type of I/O device. In one embodiment, I/O device 66 is a video capture card with a driver. Data from the video capture card is either loaded by DMA (direct memory access) or CPU 52 into a frame buffer, typically within main memory 58. However, the frame buffer may be in other memories within system 50.

System 50 also includes an AGP graphics controller 70 comprising a 3D accelerator. In one embodiment, AGP graphics controller 70 communicates with system controller 56 via an AGP bus 72. In an alternative embodiment, AGP graphics controller 70 can communicate with system controller 56 via PC1 bus 62 (e.g. as shown in phantom in FIG. 3).

Graphics controller 70 uses its own local memory 74 to generate and store pixel arrays to be displayed on a video display unit 76.

It is emphasized that system 50 is only one example of a system that performs a method in accordance with our invention. Other hardware can be used as well.

Applications for the Invention

There are many applications for our invention. For example, a method in accordance with our invention can be used to manipulate image streams such as television images. The method of our invention is particularly appropriate since video images comprise a succession of frames at a rate of about 60 frames/second in North America. For instance in the case NTSC, about 9.1 Mbytes per second throughput are required. (NTSC is an abbreviation of "North American Television Standard for Color. It is the standard used for television signals in North America).

Another application for our invention is to move and tilt portions of different video images or other images onto different portions of a screen such as a PC screen. The images, for example, could be transformed to appear on the faces of a polyhedron (e.g. a cube). By clicking on appropriate icons on a computer display, one could turn the polyhedron to see the different images on the various faces of the polyhedron. The polyhedron could be used as a new type of computer menu option display.

The manipulated image provided in accordance with our invention could be provided to any appropriate output device, e.g. a television screen, a video projector, a HDTV monitor, or a PC screen. The image manipulated in accordance with our invention could come from any of a number of sources, e.g. an analog or digital video input, a cable TV input, a satellite input, the internet, a digital scanner, a digital camera, or numerous other sources. (In the case of an analog input, one would first digitize the image.)

While the invention has been described with respect to a specific embodiment, those skilled in the art will realize that changes can be made in form and detail without departing from the spirit or scope of the invention. For example, the invention can be used to map 2D images onto substantially planar surfaces, rather than exactly planar surfaces. Accordingly, all such changes come within the invention.

We claim:

1. A method comprising:
   providing a digital representation of a two-dimensional image;
   providing a computer model of a geometric surface;
   binding said digital representation to said computer model of said geometric surface; and
   generating an array of pixels corresponding to an image to be displayed, said image to be displayed including said geometric surface textured by said two-dimensional image.

2. Method of claim 1 further comprising the act of displaying said image to be displayed on a display device.

3. Method of claim 1 further comprising the act of modifying said geometric surface whereby said displayed image does not appear flat.

4. Method of claim 2 further comprising the act of performing a digital manipulation process, said digital manipulation process comprising one of warping, resizing, melting, and rotating said image to be displayed.

5. Method of claim 2 further comprising the act of establishing the location and position of said geometric surface in a world coordinate system, wherein said act of generating said array of pixels takes into account the location and position of said geometric surface in said world coordinate system.

6. Method of claim 1 wherein said geometric surface comprises a set of polygons.

7. Method of claim 1 wherein said geometric surface is defined with an implicit technique.

8. Method of claim 1 wherein said act of mapping is accomplished using a 3D graphics pipeline.

9. Method of claim 1 wherein said representation of said two-dimensional image is obtained from a video image.

10. Structure comprising:
    a first memory for storing a digital representation of a two-dimensional image;
    a second memory for storing a model of a geometric surface;
    a third memory for storing a world coordinate system, said world coordinate system representing a location and orientation of an object to be displayed;
    a graphics 3D pipeline for binding said model of said geometric surface to said two-dimensional image and generating a pixel array corresponding to an image to be displayed, said generating of said image being based, at least in part, on said geometric surface textured in accordance with said two-dimensional image, said image being oriented and positioned in accordance with said world coordinate system.

11. Structure of claim 10 further comprising a display for displaying said image to be displayed.

12. Structure of claim 10 wherein said graphics pipeline permits manipulation of said geometric surface wherein said image to be displayed does not represent said geometric surface as flat.

13. A method comprising the acts of:
    providing a two-dimensional image to a 3D graphics pipeline;
    providing a geometric surface to said 3D graphics pipeline;
    generating a pixel array based on the binding of at least a portion of said two-dimensional image to said geometric surface.

14. Method of claim 13 comprising the act of altering said geometric surface after the binding of said at least said portion of said two-dimensional image wherein said geometric surface is not flat after said altering.

15. Structure comprising:
    a memory containing a representation of a two-dimensional image;
    a memory containing a geometric surface; and
    a 3D graphics pipeline for binding said two-dimensional image to said geometric surface and generating a pixel array corresponding to said bound two-dimensional image.

* * * * *